(12) United States Patent
Fujihara et al.

(10) Patent No.: US 10,544,820 B2
(45) Date of Patent: Jan. 28, 2020

(54) WASHER-EQUIPPED SCREW

(71) Applicant: DENSO CORPORATION, Kariya, Aichi-pref. (JP)

(72) Inventors: Takeshi Fujihara, Kariya (JP); Satoshi Iguchi, Kariya (JP); Yuya Okuda, Toyota (JP); Shuichi Iwata, Toyota (JP); Jun Asada, Toyota (JP); Keita Inoue, Niwa-gun (JP); Yoshihiro Ohta, Niwa-gun (JP)

(73) Assignee: DENSO CORPORATION, Kariya (JP)

( * ) Notice: Subject to any disclaimer, the term of this patent is extended or adjusted under 35 U.S.C. 154(b) by 85 days.

(21) Appl. No.: 15/687,867

(22) Filed: Aug. 28, 2017

(65) Prior Publication Data

US 2018/0058494 A1 Mar. 1, 2018

(30) Foreign Application Priority Data

Aug. 26, 2016 (JP) .................................. 2016-166247

(51) Int. Cl.
*F16B 43/00* (2006.01)
*F16B 41/00* (2006.01)
*F16B 39/282* (2006.01)
*F16B 39/24* (2006.01)
*F16B 35/04* (2006.01)

(52) U.S. Cl.
CPC .......... *F16B 39/282* (2013.01); *F16B 35/048* (2013.01); *F16B 39/24* (2013.01); *F16B 41/002* (2013.01); *F16B 43/001* (2013.01)

(58) Field of Classification Search
CPC ............................. F16B 43/00; F16B 43/001

USPC ......................................................... 411/533
See application file for complete search history.

(56) References Cited

U.S. PATENT DOCUMENTS

| | | | | |
|---|---|---|---|---|
| 2,761,347 A | * | 9/1956 | McKee, Jr. ............ | F16B 43/001 238/DIG. 1 |
| 3,062,557 A | * | 11/1962 | Underwood .......... | F16B 43/001 277/630 |
| 3,862,458 A | * | 1/1975 | Stanaitis .................. | B21H 3/06 470/12 |
| 4,292,007 A | * | 9/1981 | Wagner .................... | F16B 39/26 411/156 |
| 5,020,951 A | * | 6/1991 | Smith ........................ | F01L 1/46 411/107 |
| 5,308,285 A | * | 5/1994 | Malen ...................... | B21H 3/02 411/368 |
| 6,854,942 B1 | * | 2/2005 | Hargis ................ | F16B 25/0031 411/369 |

(Continued)

FOREIGN PATENT DOCUMENTS

JP H02-283910 A 11/1990

*Primary Examiner* — Flemming Saether
(74) *Attorney, Agent, or Firm* — Oliff PLC

(57) ABSTRACT

A washer-equipped screw is provided with a screw body, a flat washer, and a rubber washer. The screw body includes a cylindrical portion between a shaft portion on which a screw groove is formed and a head portion. A hole in the flat washer is inserted through the cylindrical portion so as to be adjacent to the head portion. A hole in the rubber washer is inserted through the cylindrical portion and positioned on a shaft portion side of the flat washer. The cylindrical portion is provided with a projection for engagingly locking the flat washer. An inner edge of the flat washer is caught by the projection, whereby the flat washer is prevented from detaching.

1 Claim, 3 Drawing Sheets

(56) References Cited

U.S. PATENT DOCUMENTS

| | | | |
|---|---|---|---|
| 8,955,851 B2* | 2/2015 | Matsumoto | F16J 15/104 277/651 |
| 2016/0131178 A1 | 5/2016 | Shiba | |
| 2018/0058489 A1* | 3/2018 | Fujihara | H05K 7/142 |

* cited by examiner

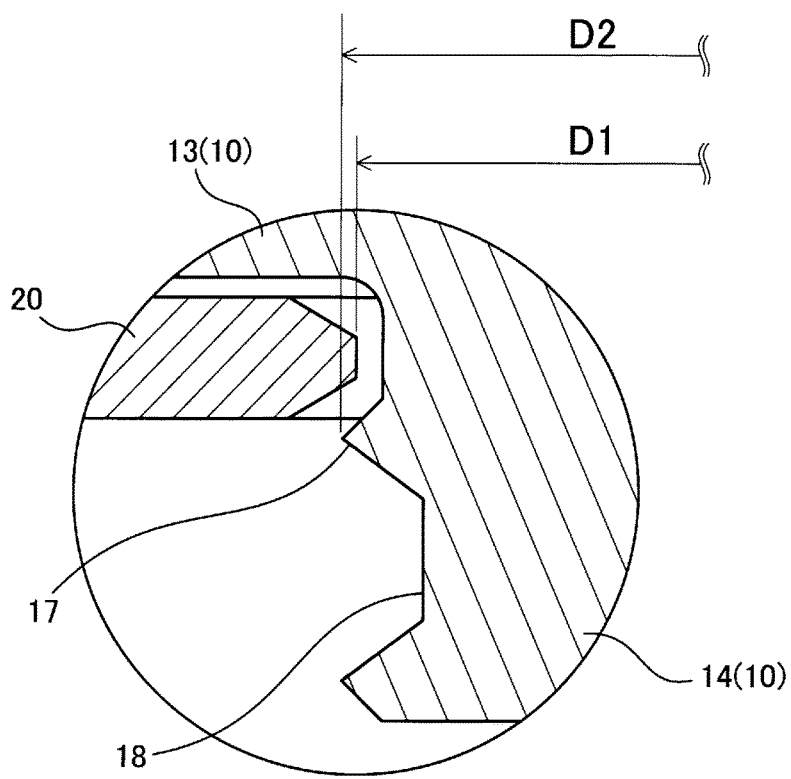

WASHER-EQUIPPED SCREW

CROSS-REFERENCE TO RELATED APPLICATION

This application is based on and claims the benefit of priority from earlier Japanese Patent Application No. 2016-166247 filed Aug. 26, 2016, the description of which is incorporated herein by reference.

TECHNICAL FIELD

The present disclosure discloses a screw equipped with a flat washer and a rubber washer. The screw in the present specification includes a bolt with a polygonal head.

BACKGROUND

There is sometimes an occasion that a screw equipped with a flat washer and a rubber washer is used for fixing a circuit board (refer to Japanese Patent Application Laid-Open Publication No. 2014-240675 as Patent Document 1, for example).

A hole in the flat washer is inserted through a shaft portion so as to be adjacent to a head portion of a screw body, and a hole in the rubber washer is inserted through the shaft portion as well.

The washer-equipped screw disclosed in Patent Document 1 pressed down a circuit board by an elastic force of the rubber washer.

A thermal deformation of the circuit board can also be absorbed by the elastic force of the rubber washer.

In the washer-equipped screw disclosed in Patent Document 1, a projection that contacts with the shaft portion of the screw body is formed on an inner peripheral surface of a hole of the rubber washer, so that the flat washer and the rubber washer do not detach.

However, the rubber washer may detach together with the flat washer with only the frictional force of the rubber washer against the shaft portion.

In addition, when it is assumed that the process of passing the flat washer through the shaft portion and further passing the rubber washer through the shaft portion is performed by a machine, there is a risk that the flat washer may detach before inserting the rubber washer.

SUMMARY

An embodiment provides a washer-equipped screw with a structure that a flat washer is hard to detach.

In a washer-equipped screw according to a first aspect, the washer-equipped screw includes a screw body having a cylindrical portion disposed between a shaft portion on which a screw groove is formed and a head portion. A hole in a flat washer is inserted through the cylindrical portion so as to be adjacent to the head portion. A hole in a rubber washer is inserted through the cylindrical portion and is positioned on a shaft portion side of the flat washer. A projection for engagingly locking the flat washer is disposed on the cylindrical portion.

In this washer-equipped screw, the projection disposed on the cylindrical portion prevents the flat washer from detaching.

Even if there is no rubber washer, the flat washer hardly detaches.

Further, a risk of the rubber washer and the flat washer detach when the rubber washer is attached is also smaller than in a case without the projection.

Note that the diameter of the cylindrical portion including the projection is approximately the same as or slightly larger than the inner diameter of the flat washer (the diameter of a hole of the flat washer).

Therefore, the flat washer can easily pass over the projection if it is pushed in.

Further, even if the diameter of the cylindrical portion including the projection is substantially the same as the inner diameter of the flat washer, the flat washer will catch on the projection and will not detach if the flat washer is slightly inclined.

In order to more reliably prevent the flat washer and the rubber washer from detaching when the rubber washer is attached, it is preferable that a groove into which the rubber washer is fitted is disposed on the cylindrical portion of the screw body.

BRIEF DESCRIPTION OF THE DRAWINGS

In the accompanying drawings:

FIG. 3 is an enlarged view in a circle indicated by reference symbol III in FIG. 1.

DETAILED DESCRIPTION OF THE PREFERRED EMBODIMENT

Figure 1:
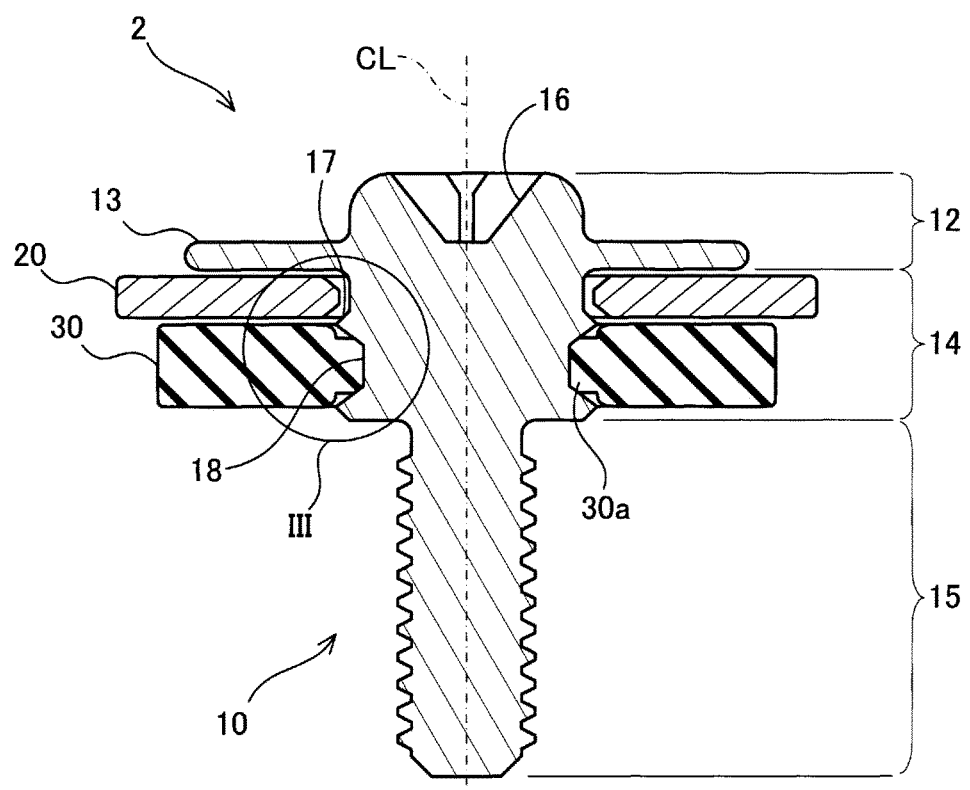
FIG. 1 shows a sectional view of a washer-equipped screw cut along an axial line.
Figure 2:
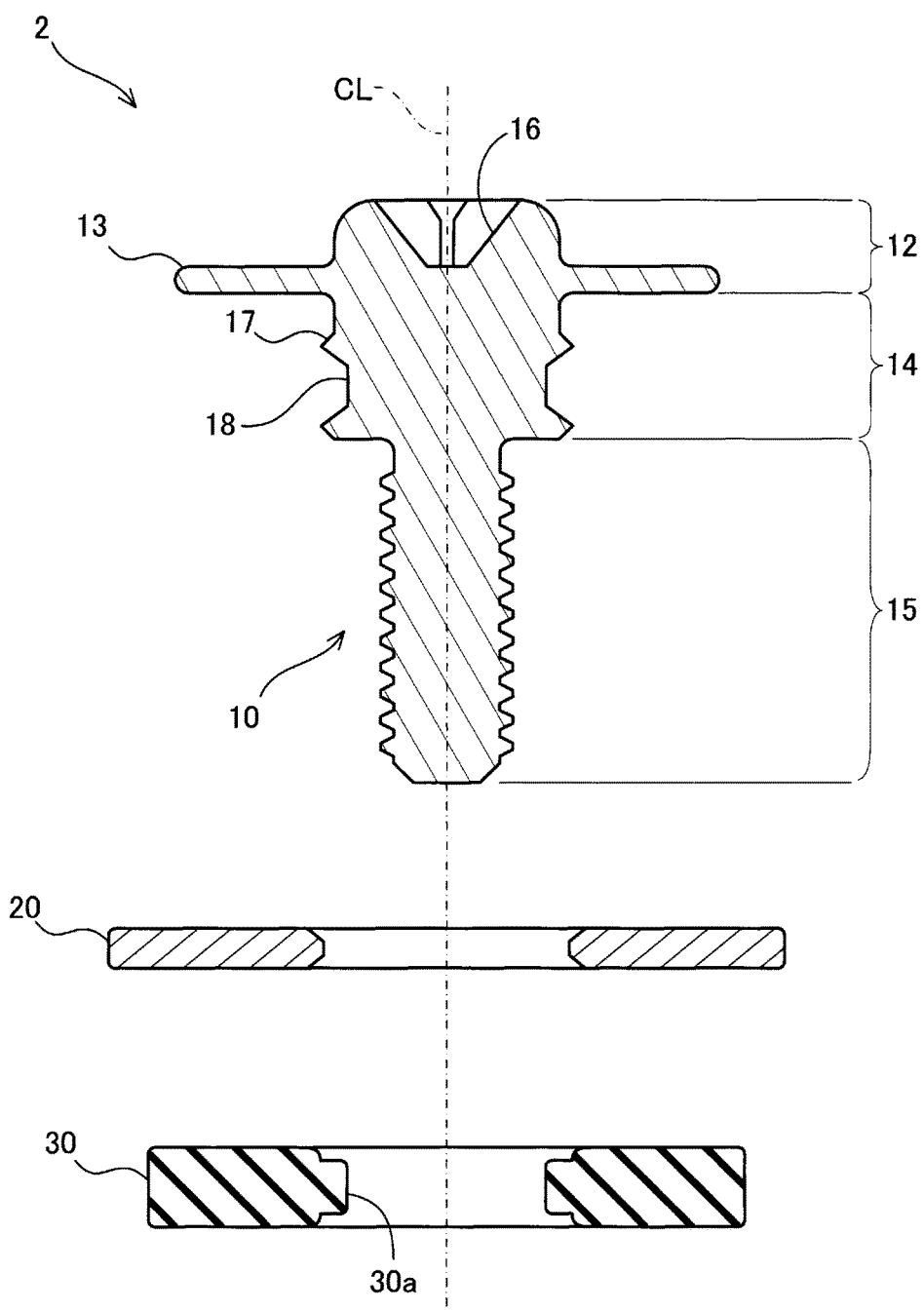
FIG. 2 shows a sectional view of the disassembled washer-equipped screw.

A washer-equipped screw 2 of an embodiment will be described with reference to the drawings. Note that a rubber washer 30 is not shown in FIG. 3.

The washer-equipped screw 2 includes a screw body 10, a flat washer 20, and a rubber washer 30.

The screw body 10 is composed of a head portion 12, a cylindrical portion 14, and a shaft portion 15 in which a thread groove is formed.

The cylindrical portion 14 is disposed between the head portion 12 and the shaft portion 15.

The diameter of the cylindrical portion 14 is smaller than the diameter of a flange 13 (mentioned later) but larger than the diameter of the shaft portion 15.

The flat washer 20 and the rubber washer 30 are inserted through the cylindrical portion 14.

The flat washer 20 is positioned on a head portion side, and the rubber washer 30 is positioned on a shaft portion side.

The head portion 12 of the screw body 10 is provided with a groove 16 into which a screwdriver is fitted and the flange 13.

The flange 13 is provided to prevent the flat washer 20 from passing over the head portion side.

A flange surface on the shaft portion side of the flange 13 corresponds to a seat surface of the screw body 10.

When the washer-equipped screw 2 is fastened, the flange surface (seat surface) receives a reaction force on the head side of the rubber washer 30 through the flat washer 20.

A deformation of the flat washer 20 is suppressed from occurring by receiving the reaction force of the rubber washer 30 at the wide flange surface.

As shown in FIG. 3, the cylindrical portion 14 is provided with a projection 17 and a groove 18.

The diameter D2 of the cylindrical portion 14 including the projection 17 is substantially the same as the inner diameter D1 of the flat washer 20 (the diameter of a hole of the flat washer 20) or slightly larger than the inner diameter D1 (in the present embodiment, the diameter D2 of the cylindrical portion 14 including the projection 17 is slightly larger than the inner diameter D1 of the flat washer 20).

Therefore, when the flat washer 20 is strongly pushed from the shaft portion side to the head portion 12 side, the flat washer 20 easily passes over the projection 17 and is positioned between the projection 17 and the flange 13.

However, the flat washer 20, once fitted between the projection 17 and the flange 13, cannot pass over the projection 17 toward the shaft portion side only due to gravity.

That is, the flat washer 20 cannot detach the screw body 10 due to gravity.

Even if the diameter D2 of the cylindrical portion 14 is substantially the same as the inner diameter D1 of the flat washer 20, the flat washer 20 will catch on the projection 17 and will not detach if the flat washer 20 is slightly inclined.

The projection 17 plays a role of engagingly locking the flat washer 20 to the cylindrical portion 14.

The flat washer 20 does not easily detach from the screw body 10, due the projection 17.

It should be noted that the projection 17 is disposed around an outer periphery of the cylindrical portion 14.

The cylindrical portion 14 is provided with a groove 18 that goes around a circumference of the cylindrical portion 14.

A rib 30a formed on an inner side of the rubber washer 30 is fitted into the groove 18.

The rubber washer 30 becomes difficult to detach from the screw body 10 by the rubber washer 30 being fitted in the groove 18 of the cylindrical portion 14.

Points to be noted regarding the technique described in the embodiments will be described.

The projection 17 provided on the cylindrical portion 14 of the screw body 10 goes around the cylindrical portion 14.

However, the projection 17 may not necessarily be a projection that goes continuously around the cylindrical portion 14 but may be one in which the length in the circumferential direction is short and a plurality of projections being arrayed in the circumferential direction of the cylindrical portion 14.

Although the flat washer 20 is preferably made of a metal having high strength, such as iron, it may be made of resin or carbon fiber.

The washer-equipped screw 2 of the embodiment is suitable for fixing circuit boards.

Since the rubber washer 30 presses the circuit board with its elastic force, the circuit board can be firmly fixed without damaging the circuit board.

However, the washer-equipped screw disclosed in the present specification is not limited to one that fixes the circuit board.

Further, the washer-equipped screw 2 of the embodiment is a type of a screw having the groove 16 in its head portion for fitting a screwdriver.

The screw in the present specification includes a bolt with a polygonal head. That is, the technique disclosed in the present specification can also be preferably applied to bolts.

Although specific examples of the present invention have been described in detail above, they are merely illustrative and do not limit the scope of the claims.

The technology described in the scope of claims includes various modifications and modifications of the specific examples exemplified above.

The technical elements described in the present specification or the drawings alone exhibit technical usefulness by various combinations and are not limited to combinations described in the claims at the time of filing.

In addition, the technology exemplified in the present specification or the drawings can achieve plural objectives at the same time, and has technical usefulness by itself achieving one of them.

What is claimed is:

1. A washer-equipped screw comprising:
   a screw body having a cylindrical portion disposed between a shaft portion on which a screw thread is formed and a head portion;
   a flat washer having a flat washer hole that has the cylindrical portion inserted therein, the flat washer disposed so as to be adjacent to the head portion; and
   a rubber washer having a rubber washer hole that has the cylindrical portion inserted therein, the rubber washer positioned on a shaft portion side of the flat washer, wherein:
   a projection for directly engagingly locking the flat washer is disposed on the cylindrical portion, and between the flat washer and the rubber washer, and
   a groove into which the rubber washer is fitted is disposed on the cylindrical portion.

* * * * *